US012794564B2

(12) United States Patent
Zhao et al.

(10) Patent No.: US 12,794,564 B2
(45) Date of Patent: Nov. 10, 2026

(54) DISTRIBUTED QUANTUM GHOST IMAGING

(71) Applicant: Cisco Technology, Inc., San Jose, CA (US)

(72) Inventors: Jiapeng Zhao, Kenmore, WA (US); Eneet Kaur, Somerville, MA (US); Ramana Rao V R Kompella, Foster City, CA (US); Hassan Shapourian, San Mateo, CA (US); Shadi Ebrahimi Asl, Raleigh, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 298 days.

(21) Appl. No.: 18/432,966

(22) Filed: Feb. 5, 2024

(65) Prior Publication Data

US 2025/0253956 A1 Aug. 7, 2025

(51) Int. Cl.
*H04B 10/70* (2013.01)

(52) U.S. Cl.
CPC .................................... *H04B 10/70* (2013.01)

(58) Field of Classification Search
CPC ...................................................... H04B 10/70
See application file for complete search history.

(56) References Cited

U.S. PATENT DOCUMENTS 8,242,428 B2 * 8/2012 Meyers ................. G01S 17/003 250/203.6
11,728,902 B1 * 8/2023 Meyers .................. H04B 10/11 398/118
2008/0037996 A1 * 2/2008 Spillane ................. B82Y 10/00 398/152
2009/0194702 A1 8/2009 Meyers et al.
2010/0046754 A1 * 2/2010 Gilfedder .............. H04L 9/0858 380/255
2014/0340570 A1 * 11/2014 Meyers ..................... G06T 5/50 348/370
2022/0085985 A1 3/2022 Kaplan
(Continued)

OTHER PUBLICATIONS

Bornman, N., Agnew, M., Zhu, F. et al. Ghost imaging using entanglement-swapped photons. npj Quantum Inf 5, 63 (2019). https://doi.org/10.1038/s41534-019-0176-5. (Year: 2019).*
(Continued)

*Primary Examiner* — Nathan M Cors
(74) *Attorney, Agent, or Firm* — Edell, Shapiro & Finnan, LLC

(57) ABSTRACT

The techniques described herein include a method of: generating a first pair of entangled photons including a first photon and a second photon having a telecommunication wavelength; interacting the first photon with an object; detecting, at the first location, the first photon at a detector without spatial resolution; providing the second photon to a server via an optical fiber, wherein the second photon is configured to be entanglement swapped with a third photon of a second pair of entangled photons generated at a second location to entangle the first photon with a fourth photon of the second pair of entangled photons; and providing an indication of the detecting the first photon to the second location, wherein the indication is configured to facilitate generation of a ghost image of the object from the fourth photon at the second location.

20 Claims, 5 Drawing Sheets

(56) References Cited

U.S. PATENT DOCUMENTS

| | | | |
|---|---|---|---|
| 2022/0113529 | A1 | 4/2022 | Bond et al. |
| 2023/0188548 | A1 | 6/2023 | Bhaskar et al. |
| 2023/0327778 | A1 | 10/2023 | Vacon et al. |

OTHER PUBLICATIONS

Bornman N., et al., "Ghost Imaging Using Entanglement-swapped Photons", npj, Quantum Information, vol. 5, No. 63, Jul. 26, 2019, pp. 1-6.

Black A.N., et al., "Quantum Nonlocal Aberration Cancellation", Physical Review Letters, Oct. 4, 2019, vol. 123, No. 14, 143603, 7 Pages.

Cao H., et al., "Controlling Light Propagation in Multimode Fibers for Imaging, Spectroscopy and Beyond", Physics, Optics, Arxiv.org, arXiv:2305.09623v1 [physics.optics], May 16, 2023, 81 Pages.

Chan K.W.C., et al., "Two-color Ghost Imaging", Physical Review A, Mar. 9, 2009, vol. 79, No. 3, 033808, pp. 1-6.

Moreau P-A., et al., "Imaging with Quantum States of Light", Quantum Physics, Arxiv.org, arXiv: 1908.03034v1 [quant-ph], Aug. 8, 2019, 25 Pages.

Shapiro J.H., et al., "The Physics of Ghost Imaging", Quantum Information Processing, Jan. 14, 2012, vol. 11, pp. 949-993.

Valencia N.H., et al., "Unscrambling Entanglement Through a Complex Medium", Nature Physics, Aug. 3, 2020, vol. 16, No. 11, pp. 1112-1116, Retrieved from https://doi.org/10.1038/s41567-020-0970-1, on May 15, 2024.

Zhou Y., et al., "High-fidelity Spatial Mode Transmission Through a 1-km-long Multimode Fiber via Vectorial Time Reversal", Nature Communications, Mar. 25, 2021, vol. 12, pp. 1-7.

* cited by examiner

DISTRIBUTED QUANTUM GHOST IMAGING

TECHNICAL FIELD

The present disclosure relates to quantum ghost imaging.

BACKGROUND

Quantum ghost imaging is a phenomenon in quantum optics that involves creating images of objects using entangled photon pairs. The concept is rooted in the principles of quantum entanglement, where two or more particles become correlated in such a way that the state of one particle instantaneously influences the state of the other, regardless of the distance between them. In the context of quantum ghost imaging, a pair of entangled photons is generated, and one of the photons interacts with an object or scene of interest, while the other photon is subjected to a measurement process, typically involving single-photon detectors or electron-multiplying charge-coupled devices (EMCCD).

DETAILED DESCRIPTION

Overview

Figure 1:
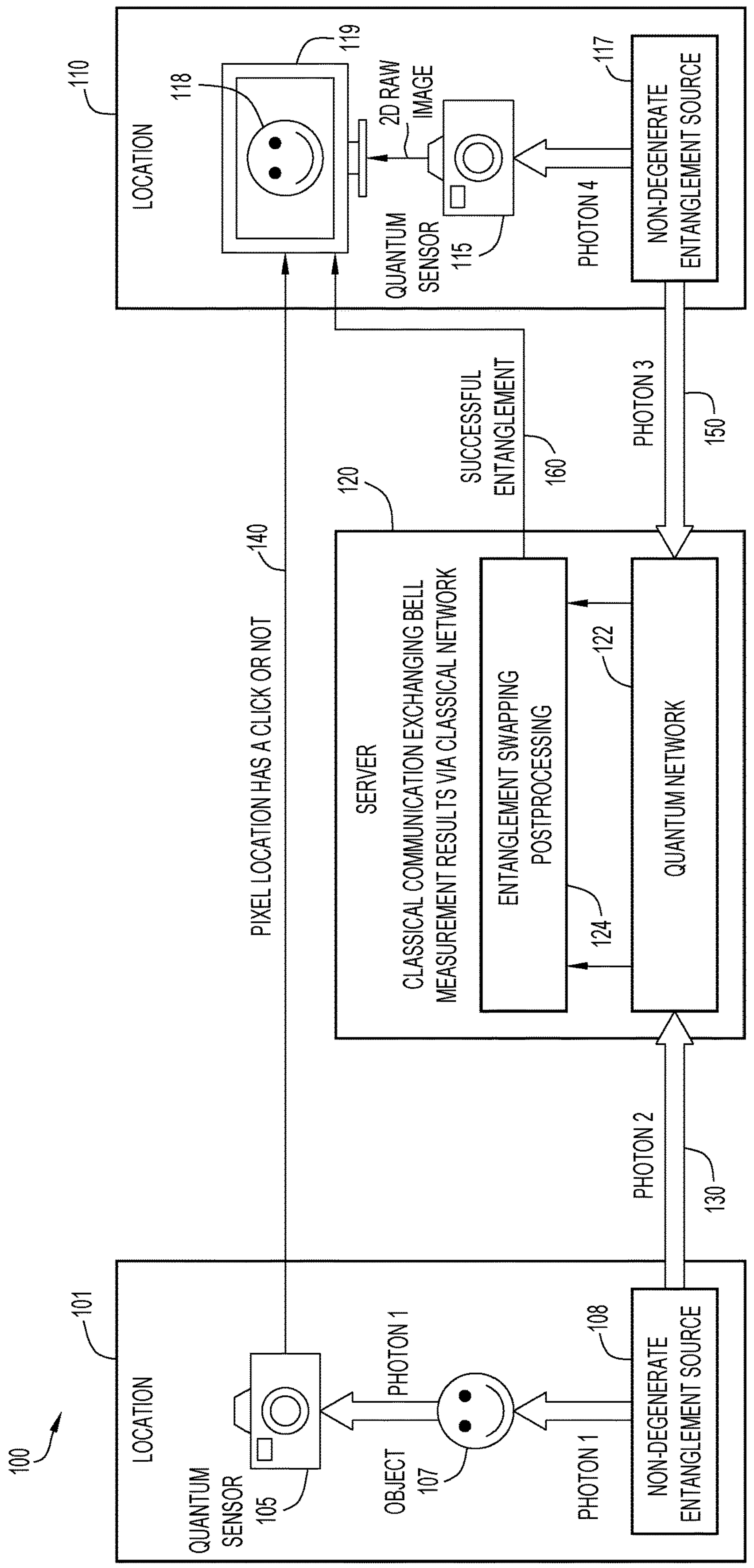
FIG. 1 is distributed environment configured to implement the distributed quantum ghost imaging techniques of this disclosure, according to an example embodiment.

In some aspects, the techniques described herein relate to a method including: generating, at a first location, a first pair of entangled photons including a first photon with a first wavelength and a second photon with a second wavelength, wherein the second wavelength is different from the first wavelength and includes a telecommunication wavelength; interacting the first photon with an object; detecting, at the first location, the first photon at a detector without spatial resolution; providing the second photon to a server via an optical fiber, wherein the second photon is configured to be entanglement swapped with a third photon of a second pair of entangled photons generated at a second location to entangle the first photon with a fourth photon of the second pair of entangled photons; and providing an indication of the detecting the first photon to the second location, wherein the indication is configured to facilitate generation of a ghost image of the object from the fourth photon at the second location.

In some aspects, the techniques described herein relate to a method including: obtaining, at a server via a first optical fiber from a first location, a second photon of a first pair of entangled photons that includes the second photon and a first photon; obtaining, at the server via a second optical fiber from a second location, a third photon of a second pair of entangled photons that includes the third photon and a fourth photon; entanglement swapping the second photon and the third photon to entangle the first photon and the fourth photon; and providing, to the second location, an indication that the entanglement swapping was successful and configured to facilitate generation of a ghost image, at the second location from the fourth photon, of an object interacted with by the first photon at the first location.

In some aspects, the techniques described herein relate to a method of forming, at a second location, a ghost image of an object arranged at a first location using a first pair of entangled photons including a first photon and a second photon generated at the first location and a second pair of entangled photons including a third photon and a fourth photon generated at the second location, the method including: generating, at the second location, the second pair of entangled photons including the third photon with a first wavelength and the fourth photon with a second wavelength, wherein the first wavelength is different from the second wavelength and includes a telecommunication wavelength; detecting, at the second location, the fourth photon at a spatially resolving detector; providing the third photon to a server via an optical fiber, wherein the third photon is configured to be entanglement swapped with the second photon to entangle the first photon with the fourth photon; obtaining, from the server, a first indication that the third photon was successfully entanglement swapped with the second photon; obtaining, from the first location, a second indication that the first photon interacted with the object and was detected at a detector without spatial resolution at the first location; obtaining an output of the spatially resolving detector; and generating a ghost image of the object at the second location using the first indication, the second indication and the output of the spatially resolving detector.

EXAMPLE EMBODIMENTS

Quantum ghost imaging is an imaging technique that relies on the quantum mechanical phenomenon of entanglement. Ghost imaging exploits the quantum correlations between entangled particles, such as photons, to create images.

In traditional quantum ghost imaging techniques, entangled photon pairs are generated in which there is a signal photon and an idler photon. The signal photon is sent toward the object to be imaged and is detected by a single-pixel detector which has no spatial resolution to resolve an image. The signal photon interacts with the object, and its spatial information is modified based on the object's characteristics. The idler photon, which does not interact with the object, is directly sent to a camera with spatial resolution. By measuring the correlated intensity patterns between the signal and idler photons over a series of measurements, a computational algorithm is used to reconstruct an image of the object. The correlation between the entangled photons allows the extraction of spatial information from the signal photon based on the measurement results of the idler photon, even though the idler photon never interacted with the object directly. Due to the nature of entangled photons, the above operations generally all take place locally, all within the confines of an optical bench.

With reference now made to FIG. 1, depicted therein is a distributed environment 100 configured to implement the ghost imaging techniques of this disclosure. Unlike traditional ghost imaging techniques, at least four photons are used, and the aspects of distributed environment 100 may allow for the ghost imaging to take place at distances significantly greater than those of traditional techniques. As understood by the skilled artisan, the operations described below may be repeated multiple times in order to construct the ghost image.

As illustrated in FIG. 1, distributed environment 100 includes a first location 101, a second location 110 and a server 120. Server 120 may be collocated with either first location 101 or second location 110, or located separately from both of first location 101 and second location 110. As explained below, server 120 provides functionality that allows for ghost imaging to take place between the first location 101 and the second location 110 via entanglement swapping performed at the server 120. Specifically, an entangled photon pair of a first photon and a second photon is generated at the first location 101, and a second entangled photon pair of a third photon and a fourth photon is generated at the second location 110. The first photon of the first entangled pair interacts with an object 107 at the first location 101, while the second photon of the first entangled pair is provided to the server 120. The third photon of the second entangled pair is also provided to the server 120. By performing entanglement swapping between the second photon and the third photon at the server 120, the fourth photon at the second location 110 may be used to generate a ghost image 118 of the object at the second location 110.

An alternative implementation of the disclosed techniques may include generating an entangled photon pair at the server 120, and then sharing the photons to first location 101 and second location 110 for local entanglement swapping. Such an implementation would implement the disclosed techniques with two entanglement swaps, one at each location. Additional functionality and/or complexity in the form of devices that perform entanglement swapping would be implemented at each of first location 101 and second location 110. Accordingly, the arrangement of devices illustrated in distributed environment 100 may provide a more simplified and/or scalable distributed ghost imaging solution.

Included first location 101 is first quantum sensor 105, an object 107, and a non-degenerate entangled photon source 108. First quantum sensor 105 may be embodied as a single photon detector that does not provide for spatial resolution, such as a bucket detector. Object 107 is the object that will be ghost imaged, and non-degenerate entangled photon source 108 generates pairs of entangled photons. The non-degenerate entangled photon source 108 may generate photon pairs at different wavelengths, i.e., the first photon and second photon from the first entangled photon source may be generated with different wavelength. According to a specific example of the disclosed techniques, the non-degenerate entangled photon sources 108 generates the first photon in a visible or near infrared wavelength and generates the second photon with an optical telecommunication wavelength, such as a wavelength between 1260 nm to 1675 nm, inclusive. The first photon of a generated entangled photon pair is sent to toward object 107 to interact with object 107 and be detected by first quantum sensor 105.

In addition to interacting the first photon with object 107, the disclosed techniques include first location 101 communicating with server 120 and second location 110 via first and second communications 130 and 140.

The first communication 130 is the communication of the second photon of the generated entangled photon pair to server 120. As noted above, in traditional ghost imaging techniques, the second photon serves as the idler photon that would be used to generate the ghost image of object 107 through its entanglement with the first photon. Accordingly, traditional ghost imaging techniques would send the second photon to a local spatially resolving detector. According to the example of FIG. 1, on the other hand, first communication 130 sends the second photon to server 120. To facilitate first communication 130, first location 101 generates the second photon with a wavelength in a telecommunication range, such as in a range of 1260-1675 nm. First communication 130 sends the second photon to server 120 via an optical fiber or an optical network. The optical network may be embodied as a quantum optical network that includes one more quantum repeaters. The quantum optical network may also include one more quantum memories. Transmitting spatial information in a single mode optical fiber may be difficult. Accordingly, multimode optical fiber may be used to transmit the second photon to the server 120 to ensure that spatial information in the form of 2D correlations in the data remains encoded in the second photon.

The second communication 140 is to second location 110 and contains data indicating if the interaction of the first photon with the object 107 resulted in detection by first quantum sensor 105. Second communication 140 may be embodied as a simple indication of whether or not the second photon is detected at first quantum sensor 105, colloquially referred to as a "click." Second communication 140 may be made via a classical communication channel to second location 110, which does not necessarily include the communication through server 120. According to other examples, the second communication 140 may be made to second location 110 via server 120. As a classical communication, second communication 140 may be embodied as one or more digital, analog, electrical or optical communication signals provided to second location 110 by one or more wired or wireless networks. In other words, included in FIG. 1 is a classical communication channel via which second communication 140 is provided to second location 110. As described below, second location 110 uses the information contained in second communication 140 to construct ghost image 118.

The data contained in second communication 140 may include data indicating the first photon was detected at first quantum sensor 105, as well as noise data for detections made by quantum sensor 105 of unentangled or otherwise stray photons.

Second location 110 also communicates with server 120 via third communication 150. Specifically, second location 110 generates an entangled pair of photons containing a third photon and a fourth photon using non-degenerate entangled photon source 117. Second location 110 generates the third photon with a telecommunications wavelength (e.g., 1260-1675 nm) and generates the fourth photon with a visible or near infrared wavelength. Third communication 150 communicates the third photon to server 120 via an optical fiber or an optical network. The optical fiber may be embodied as a multimode optical fiber and the optical network may be embodied as a quantum optical network that includes one more quantum repeaters and/or one or more quantum memories. The fourth photon, on the other hand, is sent to a spatially resolving quantum sensor 115. Spatially resolving quantum sensor 115 may be embodied as an electron-multiplying charge-coupled device (EMCCD).

Upon receipt of first communication 130 and third communication 150, server 120 has received the second photon from first location 101 and the third photon from second location 110. At this point in the disclosed techniques, the second photon is entangled with the first photon and the third photon is entangled with the fourth photon. Server 120, however, is configured to swap these entanglements.

Specifically, server 120 receives the second and third photons at a quantum network 122 incorporated into server 120. Quantum network 122 includes optical components that configure server 120 to calibrate, stabilize and correct the phase of the second photon to retrieve the entanglement between the first and second photons, as well as calibrate, stabilize and correct the phase of the third photon to retrieve the entanglement between the third and fourth photons. Technologies used to provide this stabilization, calibration and correction include performing polarization phase retrieval of a classical beacon beam in the same multimode fiber, which requires the use of polarization beam splitters with high resolution digital cameras. To correct the phase errors, the conjugate phase of the retrieved phase will be added to the second and third photons, respectively. This phase modulation can be performed by a spatial light modulator. To acquire a high accuracy phase correction, more iterations of the phase retrieval may be performed on the classical beacon beam. Once the phase error is reduced, such as to a global minimal phase error, the phase correction and calibration process may be considered a success. Quantum network 122 may also include a quantum transducer to ensure that the second and third photons have the same wavelength.

The components of quantum network 122 also configure server 120 to perform entanglement swapping of the second photon and the third photon. An optical relay, or a quantum memory may be used to match the time stamp of the second and third photons in quantum network 122. A successful swapping results in the first photon becoming entangled with the fourth photon.

Entanglement swapping is a process by which two photons that have never interacted in the past can become entangled. The entanglement swapping describes the transfer of entanglement from a priori entangled systems to a priori separable systems. In the example of FIG. 1, the separable system, the second photon and the third photon, have their entanglements to the first photon and the fourth photon, respectively, swapped, resulting in the first photon being entangled with the fourth photon. Specifically, a Bell-state measurement (BSM) is performed on the second photon and the third photon. As a result of the BSM, the first photon and the fourth photon are projected on an entangled state despite being unaware of the other's presence and never having previously interacted. Since no teleportation is required in quantum ghost imaging, an indication of the successful swapping is enough, and state rotation may not be required.

According to some implementations of the disclosed ghost imaging techniques, it may be beneficial for the above-described entanglement swapping to take place prior to the first photon interacting with the object 107 and/or prior to quantum sensor 115 detecting the fourth photon. Accordingly, first location 101 and second location 110 may be configured with structures, such as optical delay lines, that ensure that the interaction of the first photon with object 107, the detection of the fourth photon at quantum sensor 115, and the entanglement swapping of the second and third photons take place in the intended sequence.

If the entanglement swapping is successful, entanglement swapping post-processing 124 sends fourth communication 160 to the second location 110. Fourth communication 160 provides an indication to the second location 110 that the entanglement swapping at the server 120 was performed successfully. Fourth communication 160 is a classical communication, and as such may be embodied as a one or more digital, analog, electrical or optical communication signals provided to second location 110 by one or more wired or wireless networks. Now in possession of the second communication 140, the fourth communication 160, and the output of spatially resolving quantum sensor 115, second location 110 constructs ghost image 118.

As noted above, second location 110 detects the fourth photon at spatially resolving quantum sensor 115. The output of spatially resolving quantum sensor 115 is sent to computer 119, which also receives the second communication 140 and the fourth communication 160. It is through the use of this data that computer 119 is able to construct ghost image 118 of the object 107.

Specifically, computer 119 should construct images from data obtained from the fourth photon only when the fourth photon corresponds to the detection of the first photon at the first quantum sensor 105 and when an entanglement swap is successfully performed between the second and third photons. For example, if the detection of the fourth photon does not correspond to a detection of the first photon, then it should not be included in the construction of the ghost image 118. Therefore, the content of second communication 140 is used to ensure that only detections of the fourth photon that correspond to detections of the first photon are included in the construction of ghost image 118. Furthermore, if the entanglement swap performed by server 120 is unsuccessful, the fourth photon will not be entangled with the first photon, and therefore, should not be used to construct ghost image 118. When a detection of the fourth photon corresponds to both a detection of the first photon and a successful entanglement swap on the second and third photons, computer 119 uses correlations between the properties of the detected fourth photon to spatially resolve the contents of ghost image 118. To ensure the alignment of the events at quantum sensor 105, quantum sensor 115 and entanglement swapping post-processing 124, location 101, location 110 and server 120 may be aligned to a global clock. The global clock alignment may be implemented through communications in the classical communication channels between these elements of distributed environment 100.

As indicated above, the process described for the first, second, third and fourth photons may be repeated, with the first photons interacting with different portions of object 107 until a sufficient number of photons have interacted with object 107 to generate ghost image 118.

In the example process described above, a separate second communication 140 and a separate fourth communication 160 are provided to computer 119 for each first photon that interacts with object 107. According to other examples of the disclosed techniques, second communication 140 and fourth communication 160 may be sent for all repetitions of the process described above, or for a subset of all the repetitions of the process described above, used in the generation of ghost image 118. In other words, second communication 140 and fourth communication 160 may be embodied as batch communications associated with numerous cycles of the process described with reference to FIG. 1.

Figure 2:
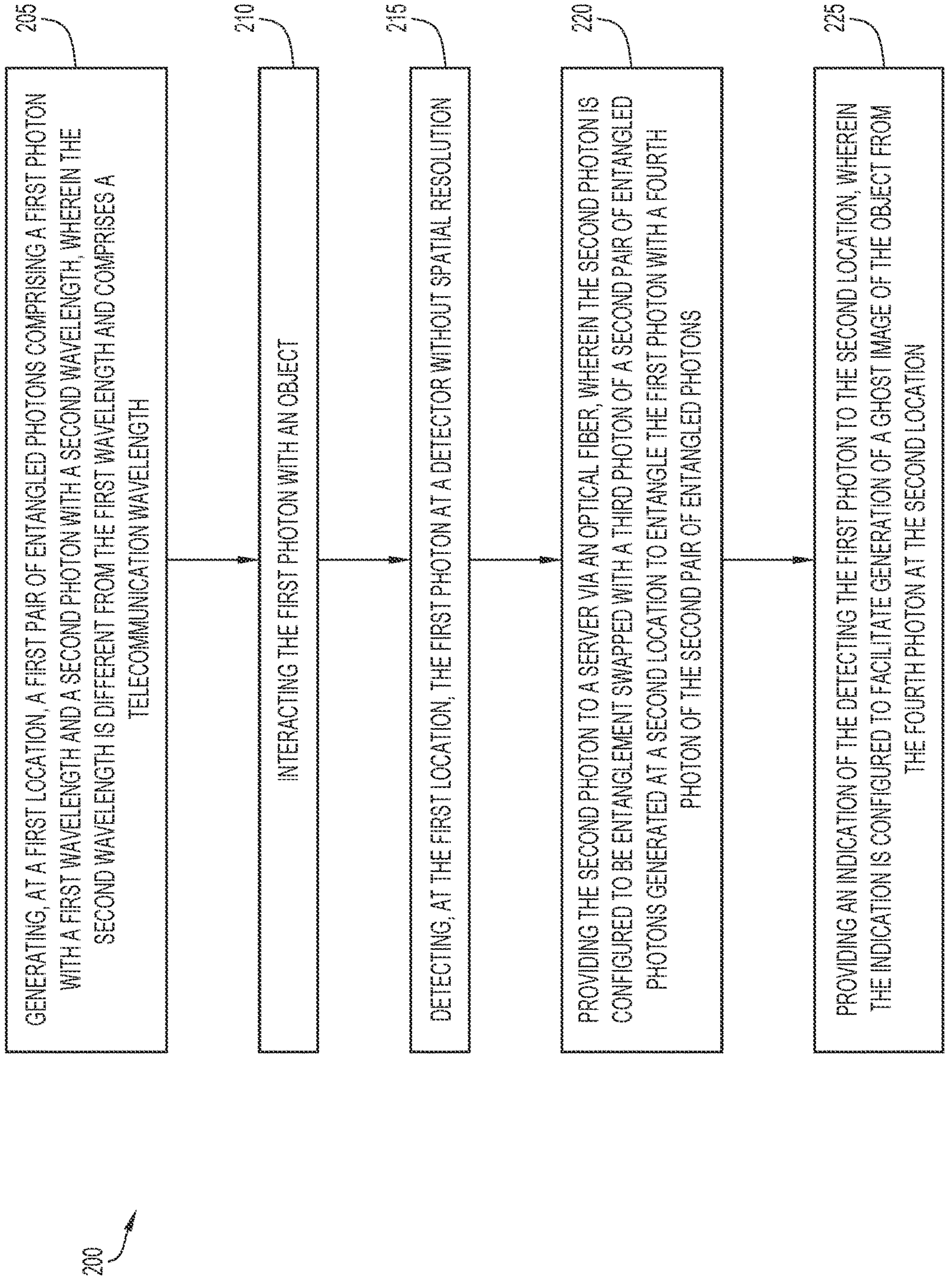
FIG. 2 is a first flowchart providing a process flow of the disclosed quantum ghost imaging techniques implemented by a location at which an object being imaged is located, according to an example embodiment.

With reference now made to FIG. 2, depicted therein is flowchart 200 providing a process for implementing the quantum ghost imaging techniques of this disclosure that are performed at a first location, such as first location 101 of FIG. 1.

Flowchart 200 begins in operation 205 in which a first pair of entangled photons are generated at a first location. The first pair of entangled photons includes a first photon with a first wavelength and a second photon with a second wavelength. According to the example of flowchart 200, the second wavelength is different from the first wavelength and is a wavelength in a telecommunication wavelength range. Accordingly, operation 205 may be embodied as the generation of the first and second photons as described above with reference to FIG. 1.

Next, in operation 210, the first photon interacts with an object. Accordingly, operation 210 may be embodied by the illumination of object 107 with the first photon, as described above with reference to FIG. 1.

In operation 215, the first photon is detected at the first location via a detector without spatial resolution. Accordingly, operation 215 may be embodied by the detection of the first photon by the first quantum sensor 105.

The second photon is provided to a server in operation 220 via an optical fiber. The second photon is configured to be entanglement swapped with a third photon of a second pair of entangled photons generated at a second location to entangle the first photon with a fourth photon of the second pair of entangled photons. Accordingly, operation 220 may be embodied as the providing of the second photon to server 120, as described above with reference to FIG. 1. While operation 220 is illustrated after operations 210 and 215 in flowchart 200, this operation may take place concurrently with or before one or more of operations 210 and 215. For example, as described above, the interaction of the first photon with the object in operation 210 may be delayed until after the second photon is entanglement swapped with the third photon. In such an implementation of the disclosed techniques, operation 220 may take place prior to operations 210 and 215. According to other implementations, operations 210, 215 and 220 may take place in the order illustrated in FIG. 2.

Finally, in operation 225, an indication of the detecting the first photon is provided to the second location. The indication in this operation is configured to facilitate generation of a ghost image of the object from the fourth photon at the second location. Accordingly, operation 225 may be embodied as the first location 101 providing the second communication 140 to the second location 110, as described above with reference to FIG. 1.

As illustrated through the discussion above, the operations of flowchart 200 are a generalized form of the operations performed at the location where the object being imaged is located, according to the disclosed ghost imaging techniques. The skilled artisan will understand that flowchart 200 may be embodied with more or fewer operations without deviating from the disclosed techniques. For example, flowchart 200 may be repeated a number of times in order to facilitate the generation of a ghost image at a second location. Similarly, embodiments of flowchart 200 may focus on the communications sent from the first location, and therefore, flowchart 200 may be embodied with a focus on the "providing" operations.

Figure 3:
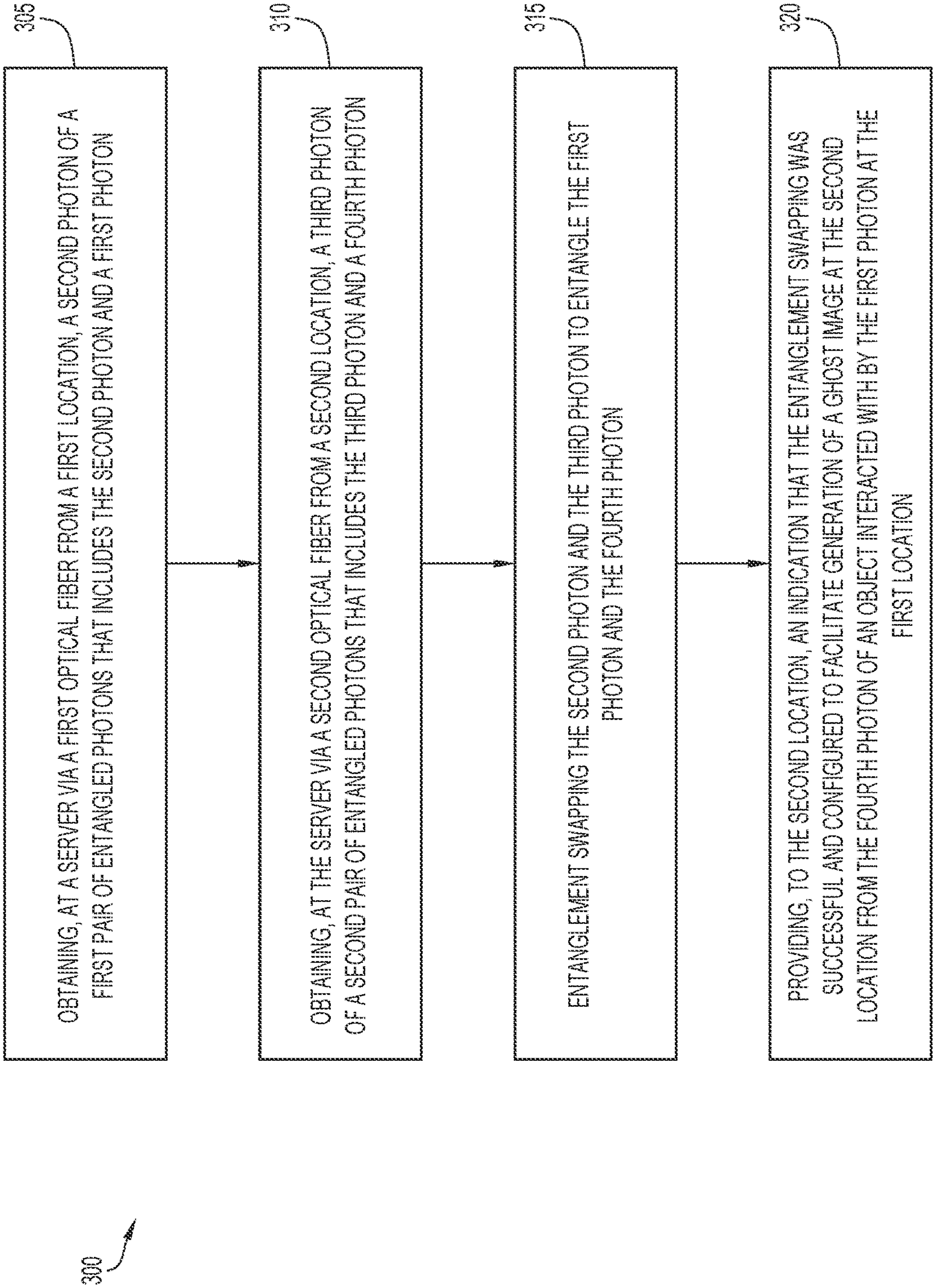
FIG. 3 is a second flowchart providing a process flow of the disclosed quantum ghost imaging techniques implemented by a server, according to an example embodiment.

With reference now made to FIG. 3, depicted therein is a flowchart 300 which provides a generalized process flow for the operations performed by a server, such as server 120 of FIG. 1, according to the disclosed techniques.

Flowchart 300 begins in operation 305 where a photon is obtained at a server. The photon is a second of two photons of an entangled photon pair. The second photon is obtained from a first location via an optical fiber. Accordingly, operation 305 may be embodied as the server 120 obtaining the second photon from first location 101, as described above with reference to FIG. 1.

In operation 310, the server obtains the third of four photons recited in flowchart 300. The third photon is one of a pair of entangled photons generated at a second location. This third photon is obtained from the second location via a second optical fiber. Accordingly, operation 310 may be embodied as the server 120 obtaining the third photon from second location 110, as described above with reference to FIG. 1.

The second and third photons are entanglement swapped in operation 315, resulting in the entanglement of the first photon and the fourth photon. Accordingly, operation 315 may be embodied as the entanglement swapping performed by server 120, as described above with reference to FIG. 1.

Finally, in operation 320, an indication that the entanglement swapping was successful is provided from the server to the second location. The indication of operation 320 is configured to facilitate generation of a ghost image at the second location from the fourth photon. This ghost image is of an object interacted with by the first photon at the first location. Accordingly, operation 320 may be embodied as the providing of fourth communication 160 to second location 110, as described above with reference to FIG. 1.

As illustrated through the discussion above, the operations of flowchart 300 are a generalized form of the operations performed at the server that performs entanglement swapping according to the disclosed techniques. The skilled artisan will understand that flowchart 300 may be embodied with more or fewer operations without deviating from the disclosed techniques. For example, flowchart 300 may be repeated a number of times in order to facilitate the generation of a ghost image at a second location. Flowchart 300 may also include operations performed on the second and third photons prior to the entanglement swapping, such as retrieving a phase of the second photon, retrieving a phase of the third photon, recalibrating the phase of the second photon, recalibrating the phase of the third photon, correcting for noise in the second photon, and/or correcting for noise in the third photon.

Figure 4:
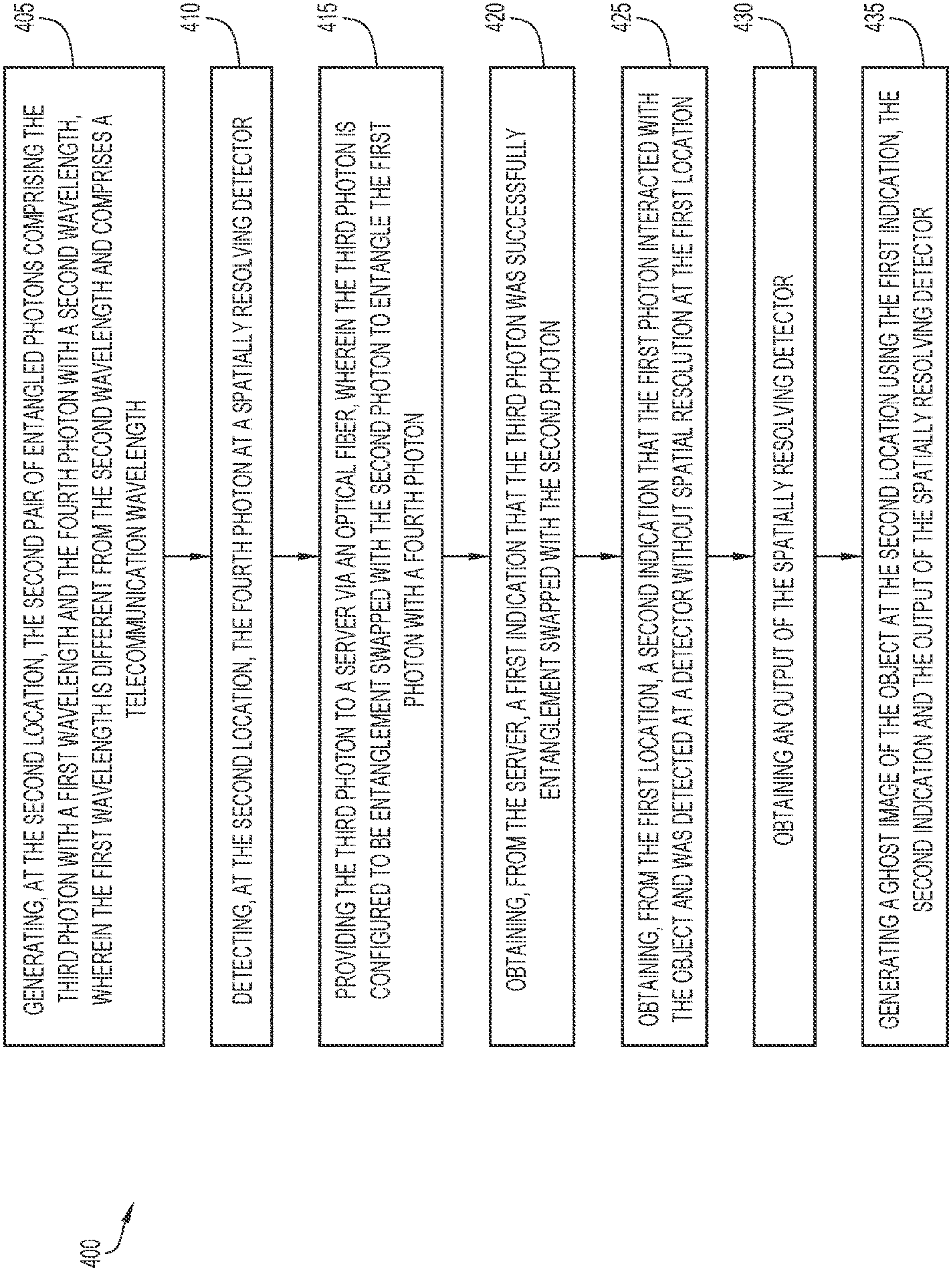
FIG. 4 is a third flowchart providing a process flow of the disclosed quantum ghost imaging techniques implemented by a location at which the image is generated, according to an example embodiment.

Turning to FIG. 4, illustrated therein is a flowchart 400 that provides a process flow for the operations performed at a location where the ghost image of the disclosed techniques is formed. In the operations of flowchart 400, the object that is the subject of the ghost image is located at a first location and the ghost image is formed at a second location. As described throughout this disclosure, the first location generates a first pair of entangled photons that includes a first photon and a second photon. The second location, whose operations are recited in flowchart 400, generates a second pair of entangled photons that includes a third photon and a fourth photon.

Flowchart 400 begins in operation 405 where the second pair of entangled photons is generated. As noted above, the second pair of entangled photons includes the third photon with a first wavelength and the fourth photon with a second wavelength. The first wavelength is a telecommunication wavelength that is different from the second wavelength. Accordingly, operation 405 may be embodied as the generation of the third and fourth photons at second location 110, as described above with reference to FIG. 1.

In operation 410, the fourth photon is detected at a spatially resolving detector of the second location. Accordingly, operation 410 may be embodied as the detection of the fourth photon by spatially resolving quantum sensor 115 of FIG. 1.

The third photon, on the other hand, is provided to a server via an optical fiber in operation 415. The third photon is configured to be entanglement swapped with the second photon to entangle the first photon with the fourth photon. Accordingly, operation 415 may be embodied as the third communication 150 which provides the third photon from the second location 110 to the server 120, as illustrated in FIG. 1.

Similar to the discussion above directed to operations 210, 215 and 220 of FIG. 2, operation 415 may take place concurrently with or before operation 410. For example, as described above, the detection of the fourth photon at the spatially resolving detector may be delayed until after the third photon is entanglement swapped with the second photon. In such an implementation of the disclosed techniques, the providing of operation 415 may take place prior to the detecting of operation 410. According to other implementations, operations 410 and 415 may take place in the order illustrated in FIG. 4.

Next, in operation 420, a first indication is obtained at the second location from the server. The first indication indicates that that the third photon was successfully entanglement swapped with the second photon. Accordingly, operation 420 may be embodied as the fourth communication 160 provided from server 120 to second location 110, as illustrated in FIG. 1.

The second location also obtains a second indication in operation 425. The second indication indicates that the first photon interacted with the object and was detected at a detector without spatial resolution at the first location. Accordingly, operation 425 may be embodied as the second communication 140 being obtained at the second location 110, as illustrated in FIG. 1.

As noted in operation 410, the fourth photon was detected at the spatially resolving detector of the second location. In operation 430, the output of the spatially resolving detector resulting from that detection is obtained at the second location. Finally, in operation 435, the ghost image of the object is generated at the second location using the first indication, the second indication and the output of the spatially resolving detector.

As illustrated through the discussion above, the operations of flowchart 400 are a generalized form of the operations performed at the location that generates the ghost image according to the disclosed techniques. The skilled artisan will understand that flowchart 400 may be embodied with more or fewer operations without deviating from the disclosed techniques. For example, flowchart 400 may be repeated a number of times in order to facilitate the generation of a ghost image at the second location.

Figure 5:
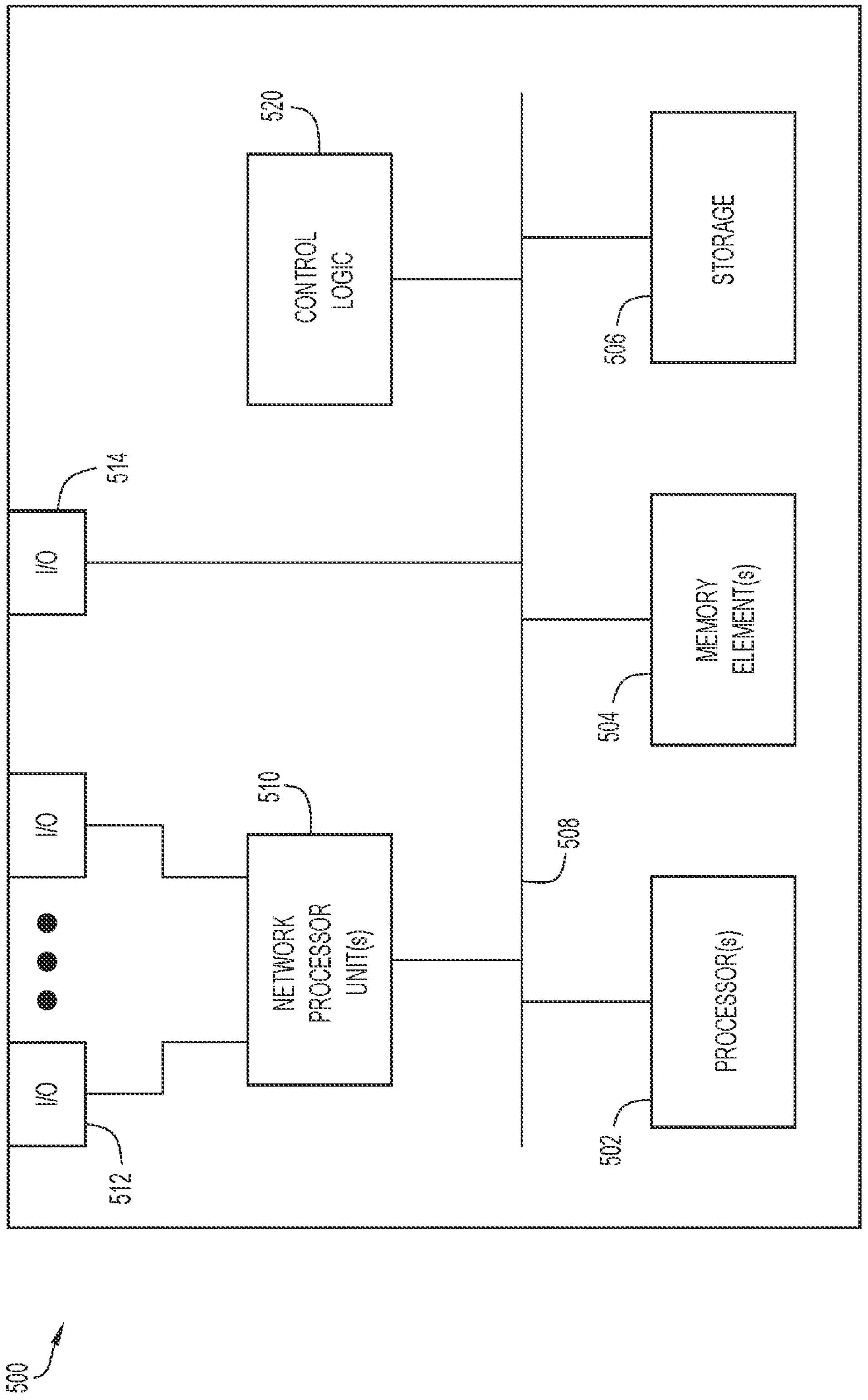
FIG. 5 illustrates a hardware block diagram of a computing device configured to implement the disclosed distributed quantum ghost imaging techniques, according to an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device or apparatus, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, the disclosed techniques use non-degenerate entanglement photon pairs to achieve an entanglement distribution. This entanglement distribution is then used to perform quantum ghost imaging between remote parties. The non-degenerate entanglement pairs not only enable efficient local detection of the object, but may also facilitate low-loss transmission of entanglement among remote locations and a quantum server. Directly transmitting the spatial information through a multimode fiber means the 2D correlation in the data is not flattened during the transmission, indicating a more efficient image transmission through network. The data transmitted through the classical channel cannot reveal the image unless the coincidence measurement of the entanglement swapping results and measurement results at the receiver.

Accordingly, in some aspects, in some aspects, the techniques described herein relate to a method including: generating, at a first location, a first pair of entangled photons including a first photon with a first wavelength and a second photon with a second wavelength, wherein the second wavelength is different from the first wavelength and includes a telecommunication wavelength; interacting the first photon with an object; detecting, at the first location, the first photon at a detector without spatial resolution; providing the second photon to a server via an optical fiber, wherein the second photon is configured to be entanglement swapped with a third photon of a second pair of entangled photons generated at a second location to entangle the first photon with a fourth photon of the second pair of entangled photons; and providing an indication of the detecting the first photon to the second location, wherein the indication is configured to facilitate generation of a ghost image of the object from the fourth photon at the second location.

In some aspects, the techniques described herein relate to a method, wherein the first wavelength includes a visible or near infrared wavelength.

In some aspects, the techniques described herein relate to a method, wherein the telecommunication wavelength includes a wavelength between 1260 nm and 1675 nm, inclusive.

In some aspects, the techniques described herein relate to a method, wherein the optical fiber includes a multimode optical fiber.

In some aspects, the techniques described herein relate to a method, wherein providing the indication of the detecting the first photon includes providing the indication to the second location via the server.

In some aspects, the techniques described herein relate to a method, wherein the detector without spatial resolution includes a photon bucket detector.

In some aspects, the techniques described herein relate to a method including: obtaining, at a server via a first optical fiber from a first location, a second photon of a first pair of entangled photons that includes the second photon and a first photon; obtaining, at the server via a second optical fiber from a second location, a third photon of a second pair of entangled photons that includes the third photon and a fourth photon; entanglement swapping the second photon and the third photon to entangle the first photon and the fourth photon; and providing, to the second location, an indication that the entanglement swapping was successful and configured to facilitate generation of a ghost image, at the second location from the fourth photon, of an object interacted with by the first photon at the first location.

In some aspects, the techniques described herein relate to a method, further including one or more of: retrieving the phase of the second photon; retrieving the phase of the third photon; recalibrating the phase of the second photon; recalibrating the phase of the third photon; correcting for noise in the second photon; or correcting for noise in the third photon.

In some aspects, the techniques described herein relate to a method, wherein entanglement swapping the second photon and the third photon includes entanglement swapping the second photon and the third photon in a quantum network.

In some aspects, the techniques described herein relate to a method, wherein entanglement swapping the second photon and the third photon includes performing a Bell-state measurement on the second photon and the third photon.

In some aspects, the techniques described herein relate to a method, wherein the second photon has a first telecommunication wavelength, and the third photon has a second telecommunication wavelength.

In some aspects, the techniques described herein relate to a method, wherein the first telecommunication wavelength and the second telecommunication wavelength are between 1260 nm and 1675 nm, inclusive.

In some aspects, the techniques described herein relate to a method, further including: obtaining, from the first location, a second indication that the first photon interacted with the object at the first location and was detected at a detector without spatial resolution at the first location; and providing the second indication to the second location via a classical network.

In some aspects, the techniques described herein relate to a method, wherein the first optical fiber and the second optical fiber include multimode optical fibers.

In some aspects, the techniques described herein relate to a method of forming, at a second location, a ghost image of an object arranged at a first location using a first pair of entangled photons including a first photon and a second photon generated at the first location and a second pair of entangled photons including a third photon and a fourth photon generated at the second location, the method including: generating, at the second location, the second pair of entangled photons including the third photon with a first wavelength and the fourth photon with a second wavelength, wherein the first wavelength is different from the second wavelength and includes a telecommunication wavelength; detecting, at the second location, the fourth photon at a spatially resolving detector; providing the third photon to a server via an optical fiber, wherein the third photon is configured to be entanglement swapped with the second photon to entangle the first photon with the fourth photon; obtaining, from the server, a first indication that the third photon was successfully entanglement swapped with the second photon; obtaining, from the first location, a second indication that the first photon interacted with the object and was detected at a detector without spatial resolution at the first location; obtaining an output of the spatially resolving detector; and generating a ghost image of the object at the second location using the first indication, the second indication and the output of the spatially resolving detector.

In some aspects, the techniques described herein relate to a method, wherein the second wavelength includes a visible or near infrared wavelength.

In some aspects, the techniques described herein relate to a method, wherein the telecommunication wavelength includes a wavelength between 1260 nm and 1675 nm, inclusive.

In some aspects, the techniques described herein relate to a method, wherein the optical fiber includes a multimode optical fiber.

In some aspects, the techniques described herein relate to a method, wherein obtaining the second indication includes obtaining the second indication from the first location via the server.

In some aspects, the techniques described herein relate to a method, wherein obtaining the second indication includes obtaining a plurality of indications indicating that a plurality of photons interacted with the object and were detected at the detector without spatial resolution.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

generating, at a first location coupled to a classical wired or wireless network and a quantum optical network including one or more quantum repeaters, a first pair of entangled photons comprising a first photon with a first wavelength and a second photon with a second wavelength, wherein the second wavelength is different from the first wavelength and comprises a telecommunication wavelength;

interacting the first photon with an object;

detecting, at the first location, the first photon at a detector without spatial resolution;

providing the second photon from the first location via the quantum optical network to a server coupled to the quantum optical network, wherein the second photon is configured to be entanglement swapped by a quantum network of the server with a third photon of a second pair of entangled photons generated at a second location remote from the first location and coupled to the first location via the classical wired or wireless network to entangle the first photon with a fourth photon of the second pair of entangled photons; and providing an indication of the detecting the first photon from the first location to the second location via a digital signal sent over the classical wired or wireless network, wherein the indication is configured to facilitate generation of a ghost image of the object from the fourth photon at the second location.

2. The method of claim 1, wherein the first wavelength comprises a visible or near infrared wavelength.

3. The method of claim 1, wherein the telecommunication wavelength comprises a wavelength between 1260 nm and 1675 nm, inclusive.

4. The method of claim 1, wherein the quantum optical network further comprises one or more quantum memories.

5. The method of claim 1, wherein providing the indication of the detecting the first photon comprises providing the indication to the second location via the server.

6. The method of claim 1, wherein the detector without spatial resolution comprises a photon bucket detector.

7. A method comprising:

obtaining, at a server via a first optical fiber from a first location, a second photon of a first pair of entangled photons that includes the second photon and a first photon;

obtaining, at the server via a second optical fiber from a second location, a third photon of a second pair of entangled photons that includes the third photon and a fourth photon;

performing one or more of retrieving a phase of the second photon, retrieving a phase of the third photon, recalibrating the phase of the second photon, recalibrating the phase of the third photon, correcting for noise in the second photon, and correcting for noise in the third photon;

entanglement swapping the second photon and the third photon to entangle the first photon and the fourth photon; and providing, to the second location, an indication that the entanglement swapping was successful and configured to facilitate generation of a ghost image, at the second location from the fourth photon, of an object interacted with by the first photon at the first location.

8. The method of claim 7, wherein the indication is provided via a classical wired or wireless network.

9. The method of claim 7, wherein entanglement swapping the second photon and the third photon comprises entanglement swapping the second photon and the third photon in a quantum network.

10. The method of claim 7, wherein entanglement swapping the second photon and the third photon comprises performing a Bell-state measurement on the second photon and the third photon.

11. The method of claim 7, wherein the second photon has a first telecommunication wavelength, and the third photon has a second telecommunication wavelength.

12. The method of claim 11, wherein the first telecommunication wavelength and the second telecommunication wavelength are between 1260 nm and 1675 nm, inclusive.

13. The method of claim 7, further comprising:

obtaining, from the first location, a second indication that the first photon interacted with the object at the first location and was detected at a detector without spatial resolution at the first location; and providing the second indication to the second location via a classical network.

14. The method of claim 7, wherein the first optical fiber and the second optical fiber comprise multimode optical fibers.

15. A method of forming, at a second location, a ghost image of an object arranged at a first location using a first pair of entangled photons comprising a first photon and a second photon generated at the first location and a second pair of entangled photons comprising a third photon and a fourth photon generated at the second location, the method comprising:

generating, at the second location, the second pair of entangled photons comprising the third photon with a first wavelength and the fourth photon with a second wavelength, wherein the first wavelength is different from the second wavelength and comprises a telecommunication wavelength;

detecting, at the second location, the fourth photon at a spatially resolving detector;

providing the third photon to a server via an optical fiber, wherein the third photon is configured to be entanglement swapped with the second photon to entangle the first photon with the fourth photon;

obtaining, from the server, a first indication that the third photon was successfully entanglement swapped with the second photon;

obtaining, from the first location, a second indication that the first photon interacted with the object and was detected at a detector without spatial resolution at the first location;

obtaining an output of the spatially resolving detector; and generating a ghost image of the object at the second location using the first indication, the second indication and the output of the spatially resolving detector.

16. The method of claim 15, wherein the second wavelength comprises a visible or near infrared wavelength.

17. The method of claim 15, wherein the telecommunication wavelength comprises a wavelength between 1260 nm and 1675 nm, inclusive.

18. The method of claim 15, wherein the optical fiber comprises a multimode optical fiber.

19. The method of claim 15, wherein obtaining the second indication comprises obtaining the second indication from the first location via the server.

20. The method of claim 15, wherein obtaining the second indication comprises obtaining a plurality of indications indicating that a plurality of photons interacted with the object and were detected at the detector without spatial resolution.

* * * * *